(12) United States Patent
Shi et al.

(10) Patent No.: US 12,346,940 B2
(45) Date of Patent: Jul. 1, 2025

(54) QUANTIFYING USER EXPERIENCE

(71) Applicant: Dell Products, L.P., Round Rock, TX (US)

(72) Inventors: Helena Shi, Plano, TX (US); Vimal Prakash, Austin, TX (US)

(73) Assignee: DELL PRODUCTS L.P., Round Rock, TX (US)

( * ) Notice: Subject to any disclaimer, the term of this patent is extended or adjusted under 35 U.S.C. 154(b) by 923 days.

(21) Appl. No.: 17/508,544

(22) Filed: Oct. 22, 2021

(65) Prior Publication Data
US 2023/0125823 A1    Apr. 27, 2023

(51) Int. Cl.
*G06Q 30/0282*    (2023.01)
*G06N 20/00*    (2019.01)

(52) U.S. Cl.
CPC ......... *G06Q 30/0282* (2013.01); *G06N 20/00* (2019.01)

(58) Field of Classification Search
CPC .................................................. G06Q 30/0282
USPC ........................................................ 706/20
See application file for complete search history.

(56) References Cited

U.S. PATENT DOCUMENTS

| | | | | |
|---|---|---|---|---|
| 8,700,487 B2* | 4/2014 | Grass | ................. | G06Q 30/0609 705/26.1 |
| 10,817,888 B2* | 10/2020 | Spears | ............... | G06Q 30/0203 |
| 10,896,428 B1* | 1/2021 | Balasubramaniam | ....................... | G10L 15/1815 |
| 11,940,899 B2* | 3/2024 | Vlachogiannis | ...... | G06F 11/302 |
| 2009/0306995 A1* | 12/2009 | Weng | ................... | G06Q 10/103 704/235 |
| 2010/0091954 A1* | 4/2010 | Dayanidhi | .............. | G10L 15/01 379/88.04 |
| 2010/0332287 A1* | 12/2010 | Gates | ..................... | G06Q 30/02 379/265.09 |
| 2011/0184771 A1* | 7/2011 | Wells | ............. | G06Q 10/063114 705/7.14 |
| 2015/0310529 A1* | 10/2015 | Ronen | ................ | G06Q 30/0631 705/26.7 |
| 2016/0140575 A1* | 5/2016 | Sorout | ............... | G06Q 30/0201 705/7.29 |

(Continued)

OTHER PUBLICATIONS

"DependencyParser" [https://spacy.io/api/dependencyparser] retrieved Oct. 5, 2023, 12 pages.

(Continued)

*Primary Examiner* — Reza Nabi
(74) *Attorney, Agent, or Firm* — Amin, Turocy & Watson, LLP

(57) ABSTRACT

A system can determine a group of input data, comprising score data, text data, and interaction data. The system can further categorize respective text data of the text data based on an intent of respective intents of the respective accounts of the respective experiences, to produce a group of categorized text data. The system can further generate respective binary sparse matrices that represent the respective interaction data of the interaction data. The system can further identify a binary sparse matrix of the binary sparse matrices that corresponds to score data of the score data that satisfies a defined score criterion, to produce an identified binary sparse matrix. The system can further store an indication of the identified binary sparse matrix, with categorized text data of the group of categorized text data corresponding to the identified binary sparse matrix.

20 Claims, 10 Drawing Sheets

(56) References Cited

U.S. PATENT DOCUMENTS

| | | | |
|---|---|---|---|
| 2016/0155181 A1* | 6/2016 | Romaya | G06Q 50/167 |
| | | | 705/26.63 |
| 2017/0116628 A1* | 4/2017 | Spears | G09B 7/10 |
| 2018/0174154 A1* | 6/2018 | Bhattacharjee | G06Q 30/016 |
| 2019/0098504 A1* | 3/2019 | Van Betsbrugge | G06Q 10/087 |
| 2019/0306044 A1* | 10/2019 | Cohen | H04L 43/04 |
| 2020/0151752 A1* | 5/2020 | Kazlou | G06Q 30/0282 |
| 2021/0136216 A1* | 5/2021 | Paiva | G10L 15/22 |
| 2022/0086066 A1* | 3/2022 | Pothireddy | G06N 20/00 |
| 2022/0141109 A1* | 5/2022 | Cohen | H04L 43/065 |
| | | | 709/224 |
| 2023/0056042 A1* | 2/2023 | Vichare | G06F 9/4843 |
| 2023/0090695 A1* | 3/2023 | Kelkar | G06Q 30/0282 |
| | | | 705/7.29 |
| 2023/0125823 A1* | 4/2023 | Shi | G06Q 30/0282 |
| | | | 705/347 |
| 2023/0316301 A1* | 10/2023 | Shi | G06N 20/20 |
| | | | 705/7.31 |
| 2024/0039905 A1* | 2/2024 | Talavera | G06F 16/248 |
| 2024/0220324 A1* | 7/2024 | Talavera | G06Q 10/10 |
| 2024/0220327 A1* | 7/2024 | Talavera | G06Q 50/01 |
| 2024/0235973 A1* | 7/2024 | Cohen | H04L 41/5032 |
| 2024/0256345 A1* | 8/2024 | Talavera | G06F 9/5027 |
| 2024/0256346 A1* | 8/2024 | Talavera | G06Q 30/0241 |
| 2024/0256355 A1* | 8/2024 | Talavera | G06F 9/505 |

OTHER PUBLICATIONS

"Linguistic Features" [https://spacy.io/usage/linguistic-features] retrieved Oct. 5, 2023, 36 pages.

"fast.ai—Making neural nets uncool again" [https://www.fast.ai/] retrieved Oct. 5, 2023, 22 pages.

Merity, et al. "Regularizing and Optimizing LSTM Language Models" arXiv:1708.02182 [cs.CL], Aug. 2017, 10 pages.

* cited by examiner

700 ↘

(702)
↓

DETERMINING A GROUP OF INPUT DATA, COMPRISING A GROUP OF SCORE DATA INDICATIVE OF RESPECTIVE RATINGS OF USER EXPERIENCES WITH A WEBSITE, AND A CORRESPONDING GROUP OF INTERACTION DATA INDICATIVE OF RESPECTIVE USER INTERACTIONS WITH THE WEBSITE DURING THE USER EXPERIENCES 704

↓

GENERATING RESPECTIVE BINARY SPARSE MATRICES THAT REPRESENT THE RESPECTIVE INTERACTION DATA OF THE CORRESPONDING GROUP OF INTERACTION DATA 706

↓

IDENTIFYING A BINARY SPARSE MATRIX OF THE BINARY SPARSE MATRICES THAT CORRESPONDS TO SCORE DATA OF THE GROUP OF SCORE DATA THAT SATISFIES A DEFINED CRITERION, RESULTING IN AN IDENTIFIED BINARY SPARSE MATRIX 708

↓

STORING AN INDICATION OF THE IDENTIFIED BINARY SPARSE MATRIX 710

DETERMINING A GROUP OF INPUT DATA, COMPRISING A GROUP OF SCORE DATA INDICATIVE OF RESPECTIVE RATINGS OF EXPERIENCES WITH A WEBSITE BY RESPECTIVE USERS, AND A CORRESPONDING GROUP OF INTERACTION DATA INDICATIVE OF THE RESPECTIVE INTERACTIONS OF THE RESPECTIVE USERS WITH THE WEBSITE 804

GENERATING RESPECTIVE MATRICES THAT REPRESENT THE RESPECTIVE INTERACTION DATA OF THE CORRESPONDING GROUP OF INTERACTION DATA 806

IDENTIFYING A MATRIX OF THE MATRICES THAT CORRESPONDS TO SCORE DATA OF THE GROUP OF SCORE DATA THAT SATISFIES A DEFINED SCORE CRITERION, TO PRODUCE AN IDENTIFIED MATRIX 808

GROUPING RESPECTIVE BINARY SPARSE MATRICES ACCORDING TO A DEFINED CRITERION, TO PRODUCE MULTIPLE GROUPINGS THAT INCLUDE A FIRST GROUPING OF BINARY SPARSE MATRICES, WHEREIN THE FIRST GROUPING OF BINARY SPARSE MATRICES COMPRISES AN IDENTIFIED BINARY SPARSE MATRIX 904

IDENTIFYING THE IDENTIFIED BINARY SPARSE MATRIX THAT HAS SCORE DATA OF A GROUP OF SCORE DATA THAT SATISFIES THE DEFINED CRITERION FROM AMONG THE FIRST GROUPING OF BINARY SPARSE MATRICES 906

QUANTIFYING USER EXPERIENCE

BACKGROUND

A customer satisfaction score (CSAT) can measure customer satisfaction with a product or service. In some examples, CSAT can be measured as a ratio of a number of positive customer responses to a total number of customer responses.

SUMMARY

The following presents a simplified summary of the disclosed subject matter in order to provide a basic understanding of some of the various embodiments. This summary is not an extensive overview of the various embodiments. It is intended neither to identify key or critical elements of the various embodiments nor to delineate the scope of the various embodiments. Its sole purpose is to present some concepts of the disclosure in a streamlined form as a prelude to the more detailed description that is presented later.

An example system can operate as follows. The system can determine a group of input data, comprising a group of score data indicative of respective ratings of respective experiences of respective users with a website, a corresponding group of text data indicative of respective accounts of the respective experiences of the respective users with the website, and a corresponding group of interaction data indicative of respective interactions of the respective users with the website. The system can further categorize respective text data of the corresponding group of text data based on an intent of respective intents of the respective accounts of the respective experiences, to produce a group of categorized text data. The system can further comprise generating respective binary sparse matrices that represent the respective interaction data of the corresponding group of interaction data. The system can further identify a binary sparse matrix of the binary sparse matrices that corresponds to score data of the group of score data that satisfies a defined score criterion, to produce an identified binary sparse matrix. The system can further store an indication of the identified binary sparse matrix, with categorized text data of the group of categorized text data corresponding to the identified binary sparse matrix.

An example method can comprise determining, by a system comprising a processor, a group of input data, comprising a group of score data indicative of respective ratings of user experiences with a website, and a corresponding group of interaction data indicative of respective user interactions with the website during the user experiences. The method can further comprise generating, by the system, respective binary sparse matrices that represent the respective interaction data of the corresponding group of interaction data. The method can further comprise identifying, by the system, a binary sparse matrix of the binary sparse matrices that corresponds to score data of the group of score data that satisfies a defined criterion, resulting in an identified binary sparse matrix. The method can further comprise storing, by the system, an indication of the identified binary sparse matrix.

An example non-transitory computer-readable medium can comprise instructions that, in response to execution, cause a system comprising a processor to perform operations. These operations can comprise determining a group of input data, comprising a group of score data indicative of respective ratings of experiences with a website by respective users, and a corresponding group of interaction data indicative of the respective interactions of the respective users with the website. The operations can further comprise generating respective matrices that represent the respective interaction data of the corresponding group of interaction data. The operations can further comprise identifying a matrix of the matrices that corresponds to score data of the group of score data that satisfies a defined score criterion, to produce an identified matrix.

BRIEF DESCRIPTION OF THE DRAWINGS

Numerous embodiments, objects, and advantages of the present embodiments will be apparent upon consideration of the following detailed description, taken in conjunction with the accompanying drawings, in which like reference characters refer to like parts throughout, and in which:

FIG. 7 illustrates another example process flow for quantifying user experience, in accordance with an embodiment of this disclosure;

FIG. 8 illustrates another example process flow for quantifying user experience, in accordance with an embodiment of this disclosure;

FIG. 9 illustrates an example process flow for aggregating journey matrix data, and that can facilitate quantifying user experience, in accordance with an embodiment of this disclosure;

DETAILED DESCRIPTION

Overview

Figure 1:
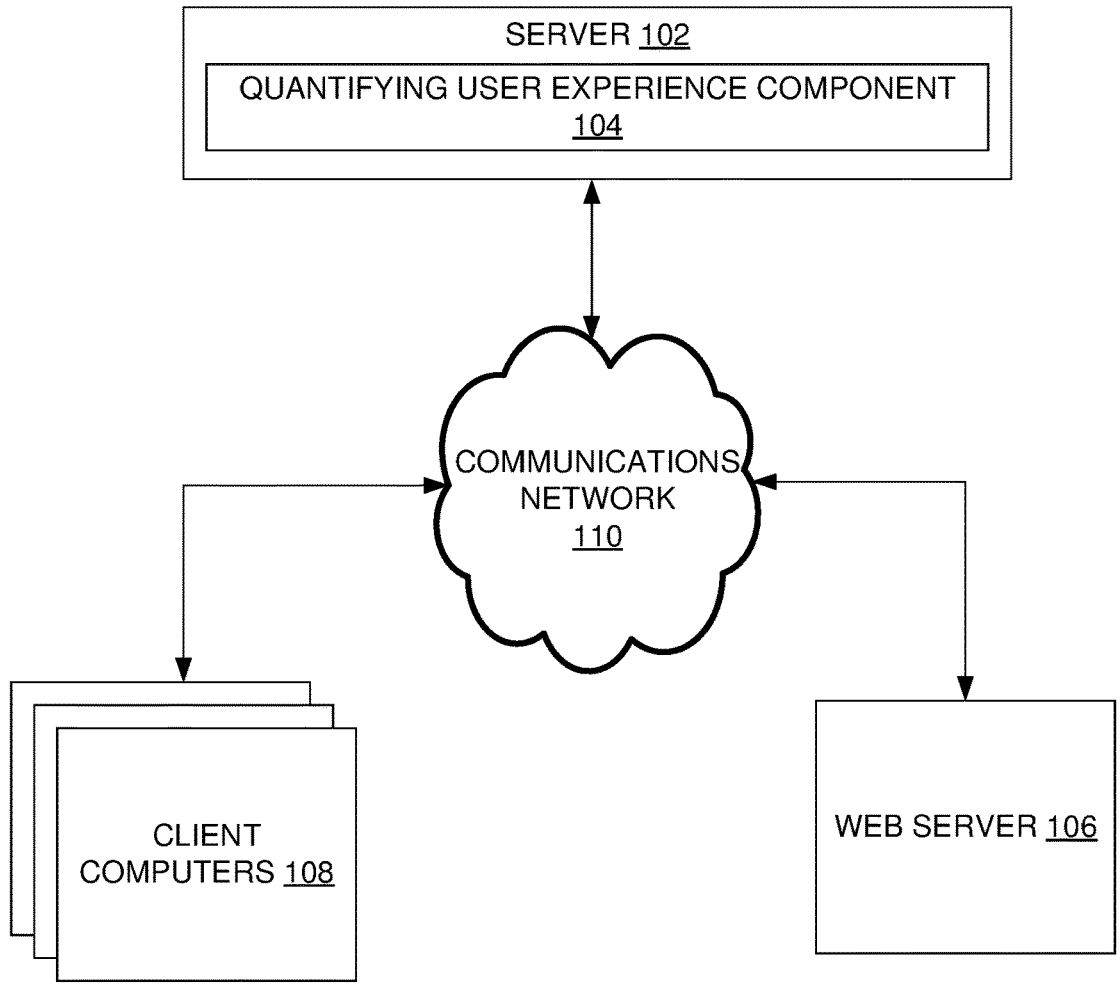
FIG. 1 illustrates an example system architecture that can facilitate quantifying user experience, in accordance with an embodiment of this disclosure.

There can be problems associated with tracking customer satisfaction of using a website. These problems can include a lack of connectivity between customer intents and behaviors on the website and their satisfaction of the website. These problems can include a large amount of manual effort and time spent analyzing verbatims (which can generally comprise unstructured text data received from a customer that describes the customer's experience) and web journey data (which can generally identify actions taken on a website by a user, such as which pages the user visited, and which links the user clicked).

These problems can include disconnected CSAT analytics and approaches. These problems can also include a lack of real-time analysis that creates a lag between a user's experience and a proactive solution.

The present techniques can be applied to mitigate against these problems. A CSAT artificial intelligence (AI) engine can comprise a machine learning-powered framework configured to improve CSAT by identifying and reporting actionable insights through integrated machine learning solutions. By pre-processing and connecting online web journey data and survey data in real time, the present techniques can provide for a flexible architecture that can be utilized with several different tools, and apply a consolidated approach to capturing CSAT insights. The present techniques can also provide flexibility to continuously develop and refine solutions, as well as ingest new data. An output of a CSAT AI engine architecture can be visualized through use cases such as a dashboard or journey mapping.

The present techniques can be applied to provide various advantages relative to prior techniques. There can be increased analysis speed and efficiency through automation of scrubs and deep dives. There can be a dynamic and flexible structure and solutions for future growth. There can be a reduction of personal, or manual, bias in analysis. There can be a cohesive, as well as individually-tailored, approach to data analysis. There can be a code-free, intuitive, and accessible dashboard that can be utilized without technical skill.

Results of a CSAT survey can be a key performance indicator (KPI), where users express their overall experience with a product or service, such as an experience in self-helping through a website. A CSAT survey can comprise questionnaires related to user activity, a rating score between 0 (the worst) and 10 (the best), and a textual field in which written feedback can be provided. Architectures according to the present techniques can set a layout to capture and represent a user journey and experience in a matrix, thereby facilitating implementing machine learning techniques, and can be utilized to create and analyze user segments for their rating patterns.

When a user starts filling out a survey on a website, the scores that the user provides can correlate with their profile and experiences they have previously had with the website, or an entity that provides the website. To analyze user behavior and determine a root cause of bad ratings, experiences can be quantified and included in analysis.

In an example where each user is considered to be a data point, then a user can have the following data attributes. The data attributes can include physical attributes (e.g., a type of product, a region, a warranty status, a type of user, and an age of a product). The data attributes can include direct experience (e.g., survey data, including verbatims provided by a user). The data attributes can include indirect experience (e.g., an online web journey experience, which can indicate whether diagnostics were run, a driver was downloaded, a topic was researched, there was an experience with tech support, or whether a delivery is expected).

Where prior techniques may have analyzed physical and direct experience attributes, they require great manual effort to find insights and patterns within this information, and not many segments can feasibly be analyzed.

The present techniques can be applied to first quantifying overall user experience before a user completes a CSAT survey, then creating an architecture through which these data attributes can be consumed to generate insights and improve user experience.

The present techniques can be applied to use a CSAT AI engine architecture to solve a problem of lack of connectivity between customer intents and behaviors with their satisfaction on a website.

In this disclosure, a CSAT AI Engine architecture can be implemented to solve the following problems. There can be a focus on tracking and understanding CSAT data. In an example, 10% of users that visit a support website to solve issues around a device they own can be randomly offered a CSAT survey, which asks them to give feedback on their online experience. In a CSAT survey, users can provide a rating (e.g., from 0-10) on their experience during their online journey, and they can also leave textual feedback in response to questions of, "What did you like about your experience?" and "What would you like to see improved about the website?" The responses to these textual questions can be referred to as "verbatims."

There can be approaches to understanding a user's reasoning behind the rating and verbatim they leave. An analyst can track through a user's individual journey via screenshots and screen recording. However, this approach can be labor and time intensive. Furthermore, each journey can be highly individual, so there might not be a high-level view to understand larger trends between users' online journey and the survey they leave. In a CSAT AI engine, a CSAT rating can be associated with website components through a component that captures key website features visited by the user, including applications on the site, articles read, drivers downloaded, and time spend.

The present techniques can be applied to use a CSAT AI engine architecture to solve a problem of high manual effort and time spent on verbatim and journey analysis. Prior approaches to analyze and deep dive on users' verbatims and journeys can be high-effort and time intensive. In an example, as much as 10 hours can be spent to manually scrub 50 verbatims and online replay sessions. Through a CSAT AI engine, this effort can be reduced by processing and creating informative features from the verbatims (such as sentiment, intuitions, and keyword analysis), and the web journey (such as applications visited, engagement, and time spent), which can provide a rich view of a user's online experience. After visualizing an output in an interactive interface, a deep dive can be made in a streamlined fashion and without a need for coding or technical skill.

The present techniques can be applied to use a CSAT AI engine architecture to solve a problem of disconnected CSAT analytics and approaches. A CSAT metric can be tracked and followed closely by many teams. As it is broken down into individual teams, each group can approach CSAT analysis differently, gather findings with different assumptions, and calculate the findings' impact on CSAT differently. A problem with a scattered approach can be that there is not one source of truth for measuring CSAT impact. The present techniques can be applied to provide a unified approach to measuring CSAT impact.

The present techniques can be applied to use a CSAT AI engine architecture to solve a problem of a lack of real time analysis causing a lag between a user's experience and a proactive solution. When a user experiences a dissatisfactory event in their online experience, with prior approaches, there can be a lag of a few days to a week before a website operator sees the survey. The user can by then have formed an opinion of the operator and its services that can be difficult to retroactively change. The present techniques can be applied to provide for quicker analysis of CSAT impact relative to when the user interacted with the website.

By implementing the present techniques, questions can be answered such as, "How many users from the United States are complaining after trying to extend their warranty, and what is their average CSAT score, during the first quarter of 2021?" and "How many laptop users from India are trying to download a driver before filling out a survey, and what is their average CSAT score during the second quarter of 2021?"

An answer to a question of, "How many users from the United States are complaining after trying to extend their warranty, and what is their average CSAT score, during the first quarter of 2021?" can be addressed as follows. A query can be written to select all users that meet the following conditions, count their numbers and then determine their average CSAT score. These conditions can be Fiscal Quarter=FY2021Q1; Country=United States; WarrantyExtend=1; Verbatim Intuition='Complaint.'

Where a CSAT AI engine dashboard is implemented, this question can be answered through a dashboard by making appropriate selections.

By making some intuitive selections, one can determine the specific information relating to users who fall under that category. It can be determined that the main topic of their complaints include "service" or contact issues related to their purchase. Through an automatic CSAT Impact calculation, it can be determined that by addressing the issues faced, there is a potential to increase CSAT by 6.94 bps, which becomes a 0.07% change in CSAT.

In a second example, an answer to a question of "How many laptop users from India are trying to download a driver before filling out a survey, and what is their average CSAT score during the second quarter of 2021?" can be determined. A query can be written to select all users that meet the following conditions, count their numbers and then determine their average CSAT score. These conditions can be Fiscal Quarter=FY2021Q2; Country=India; Driver Download=1; Product Description=Laptops.

Where a CSAT AI engine dashboard is implemented, this question can be answered through a dashboard by making appropriate selections.

From these journey features, for example, it can be determined that users meeting these criteria have a CSAT score of 49.76%. Through a CSAT impact calculation, it can be determined that there is a potential to increase overall CSAT by 98.46 bps, which corresponds to a 0.98% change in CSAT.

The present techniques can be implemented to provide a CSAT by application. Prior techniques can lack a mechanism to assign a survey rating score to individual components of a website and journey overall. The present techniques can facilitate assigning and tracking CSAT score by individual aspects of a user experience. An impact created by each component can be determined, and issues faced by users can be highlighted. Applications that are tracked (e.g., Article, Warranty Extend, and Contact Us) can encompass specific and different pages in a high-level aggregation, and permit comparing the performance of these pages in CSAT score, visits, and overall impact.

The present techniques can also be implemented to provide connectivity between physical data, direct data, and indirect data. The present techniques can be applied to create an architecture that links previously distinct and unprocessed sources of data to discover links between them, connect insights, and capture future recommendations. By automating this architecture, analysts can immediately see the CSAT score of website applications, and attribute CSAT score fluctuations to various combinations of features, ranging from website activity to product type. A CSAT AI engine can uniquely facilitate recreating an entire experience of a user, from an online website journey, to contacting a support agent, to filling out a CSAT survey. For example, a verbatims analysis tab in a user interface can show a linkage by capturing a view of users who not only visited a "warranty extend" page, but also left a complaint in a CSAT survey.

The present techniques can also be implemented to provide a universal CSAT analytical framework. With a CSAT AI engine, a bps impact of journeys, applications, and barriers/verbatim features on CSAT can be determined, and used to provide uniform CSAT metrics and tracking across websites, and parts of a website. Through this approach, stakeholders can be provided with a cohesive and comprehensive root cause approach to analyzing CSAT score fluctuations. An overall CSAT impact change affect can be determined from a bps impact. CSAT can comprise a feedback provided based on multiple experiences, and a CSAT AI engine can normalize this feedback so it is directly comparable.

The present techniques can also be implemented to provide experience quantification. A problem with prior techniques can be an inability to include qualitative aspects such as experience, intent, and engagement. The present techniques can facilitate breaking down a user's journey into multiple components, and then assigning them to binary values. Once combined, these variables can provide a way to assign CSAT values to a qualitative user experience. For example, actions during a journey such as articles visited, or a driver downloaded, can be aggregated, quantified, and grouped into an overall view.

Example Architectures

FIG. 1 illustrates an example system architecture 100 that can facilitate quantifying user experience, in accordance with an embodiment of this disclosure.

System architecture 100 comprises server 102, web server 106, client computers 108, and communications network 110. In turn, server 102 comprises quantifying user experience component 104. It can be appreciated that the arrangement of elements in system architecture 100 is one example, and that other arrangements can be used to apply the present techniques. For example, quantifying user experience component 104 can be hosted on web server 106.

Figure 10:
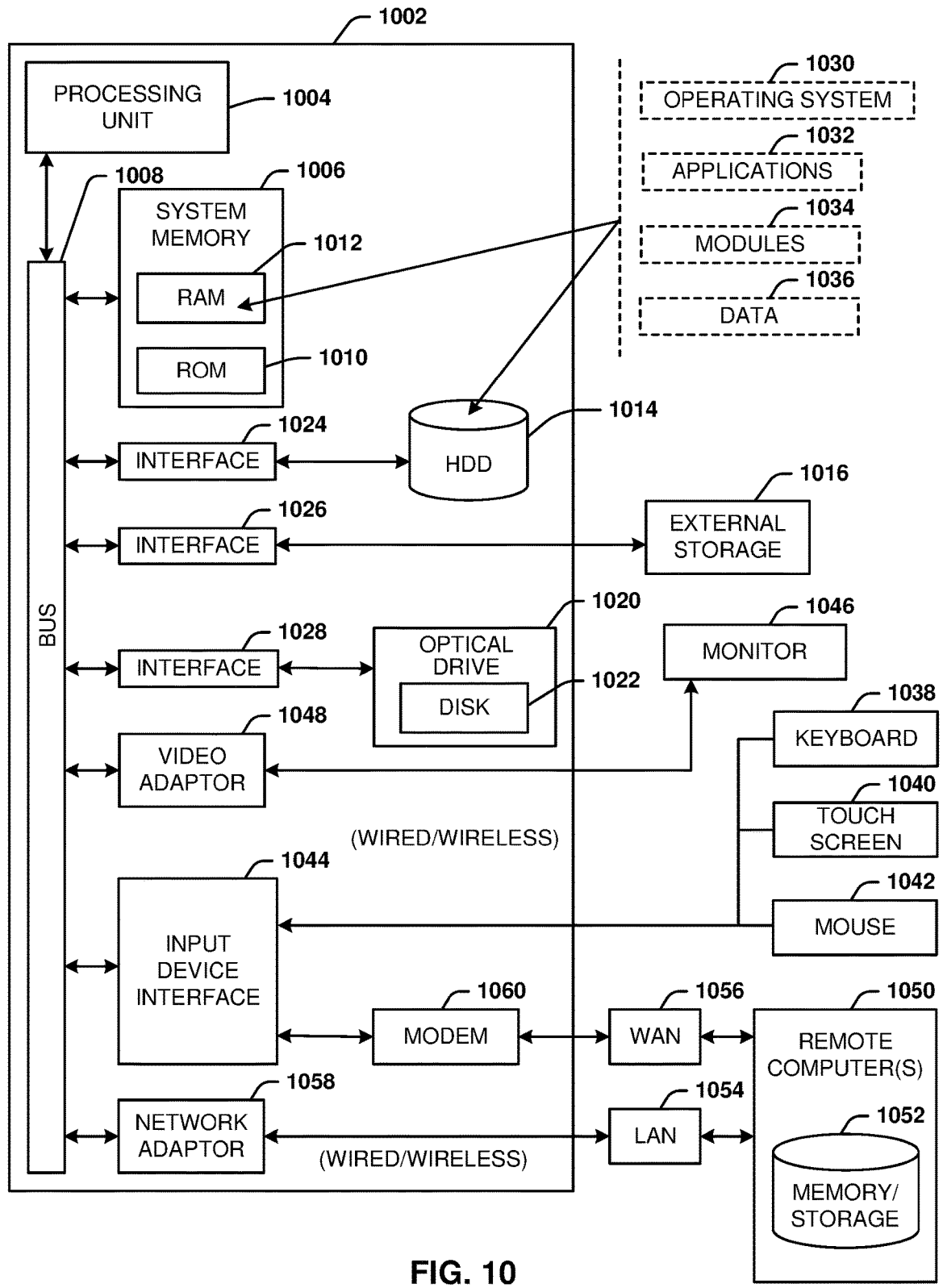
FIG. 10 illustrates an example block diagram of a computer operable to execute an embodiment of this disclosure.

Each of server 102, web server 106, and client computers 108 can be implemented with part(s) of computing environment 1000 of FIG. 10. Communications network 110 can comprise a computer communications network, such as the Internet.

Client computers 108 can comprise one or more computers that accesses web pages served by web server 106. client computers 108 and web server 106 can communicate via communications network 110. A series of interactions that a user account associated with client computers 108 makes with a web site served by web server 106 can be referred to as a web journey, and this information can be determined by quantifying user experience component 104. Web server 106 can also provide the user account with a CSAT survey, and receive back input data indicative of a CSAT score and/or a verbatim. This information can also be processed by quantifying user experience component 104.

Quantifying user experience component 104 can process web journey data and CSAT data to quantify the user's experience with the web site, such as to identify paths on the website, pages on the website, or tasks on the website (e.g., to access a particular driver program) where customer satisfaction can be improved. In effectuating quantifying user experience, quantifying user experience component 104 can implement part(s) of the operating procedures of FIGS. 6-9.

Figure 2:
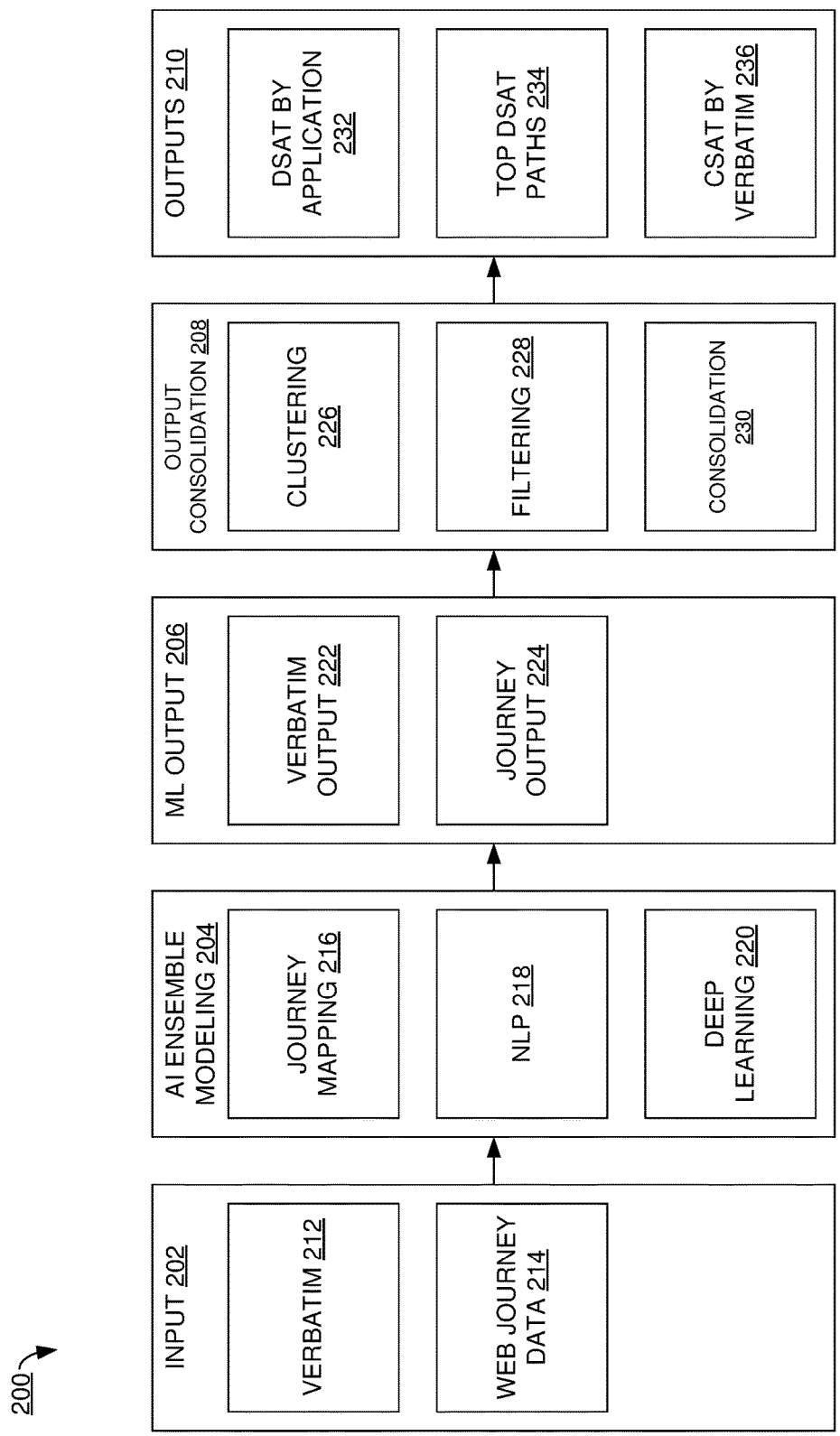
FIG. 2 illustrates another example system architecture that can facilitate quantifying user experience, in accordance with an embodiment of this disclosure.

FIG. 2 illustrates another example system architecture 200 that can facilitate quantifying user experience, in accordance with an embodiment of this disclosure. In some examples, system architecture 200 can be used to implement part(s) of quantifying user experience component 104 of FIG. 1. System architecture 200 can be implemented with part(s) of computing environment 1000 of FIG. 10.

System architecture 200 comprises input 202, artificial intelligence (AI) ensemble modeling 204, machine learning (ML) output 206, output consolidation 208, and outputs 210. In turn, input 202 comprises verbatim 212 and web journey data 214. AI ensemble modeling 204 comprises journey mapping 216, natural language processing (NLP) 218, and deep learning 220. ML output 206 comprises verbatim output 222 and journey output 224. Output consolidation 208 comprises clustering 226, filtering 228, and consolidation 230. Outputs 210 comprises customer dissatisfaction (DSAT) by application 232, top DSAT paths 234, and CSAT by verbatim 236.

Verbatim 212 can comprise text data and/or a CSAT score received from user input. Web journey data 214 can comprise information about a web journey that a user account took with a website (e.g., a website served by web server 106 of FIG. 1). Both verbatim 212 and web journey data 214 can correspond to the same user account.

Journey mapping 216 can comprise analyzing web journey data 214 to create a binary, unordered, sparse matrix (e.g., sparse matrix 308 of FIG. 3) that represents that web journey data, as journey output 224. NLP 218 and deep learning 220 can be applied to verbatim 212 similar to as described with respect to system architecture 400 of FIG. 4, to produce verbatim output 222.

Verbatim output 222 and journey output 224 can then be aggregated into groups of similar journeys (e.g., journeys where a user account downloaded a driver and accessed a "contact us" web page) based on their matrix representation via techniques such as clustering 226, filtering 228, and consolidation 230. From these aggregated groups, statistically significant outliers within a group can be identified. Information can be conveyed in outputs 210, using techniques such as displaying a DSAT score by application 232 of a website, showing top DSAT paths 234 of web journeys, and showing CSAT by verbatim 236, which can identify portions of text that correspond to statistically significant high or low CSAT score values.

In system architecture 200, input 202 (e.g., physical data, direct experience data, and indirect experience data) can enter system architecture 200, and go through various forms of processing and feature extraction (e.g., AI ensemble modeling 204, ML output 206, and output consolidation 208). An output sparse matrix (which can be similar to sparse matrix 308 of FIG. 3) and verbatim features can be included in visualization dashboards and machine learning models of outputs 210.

An AI/machine learning-powered framework that is similar to system architecture 200 can be implemented to improve CSAT through targeted solutions for identifying and reporting actionable insights via a combination of a sparse matrix alongside multiple machine learning models. By pre-processing and connecting online web journey data and survey data (e.g., applying AI ensemble modeling 204 to input 202), the present techniques can be applied to an architecture that can be utilized in an umbrella of different tools that are focused on using a consolidated strategy for capturing CSAT insights.

By using a CSAT AI engine architecture, which can be similar to system architecture 200, users can experience various benefits. A benefit can be an increased speed of analysis and reduced effort through an automation of scrubs and deep dives. This system architecture can be readily applied over real-time data to identify trends across multiple segments of a customer journey. A deviation in these trends can be quickly identified. Using prior techniques, it can take weeks to identify a cause behind a CSAT drop.

Another benefit can stem from a dynamic and flexible structure. The system architecture can have a dynamic structure, where new journey components can be added and assimilated. This approach can provide an advantage of tailoring analysis to particular business segments and stakeholders.

Another benefit can relate to a reduction or personal, or manual, bias in analysis. By capturing data features with binary flags, information-backing analysis can be driven from data rather than personal judgment, which can be affected by personal bias.

The architecture can provide for an approach to data analysis that is both cohesive and individually-tailored. A large and comprehensive sparse matrix and determinations for impact of CSAT score can provide a cohesive source of truth for stakeholders interacting with the data.

In addition, features, applications, and options can permit users to filter and capture insights that are specific to their use cases, without restrictions.

Using the architecture can be done through intuitive and accessible dashboards that stakeholders can use without coding, or technical skill.

Figure 3:
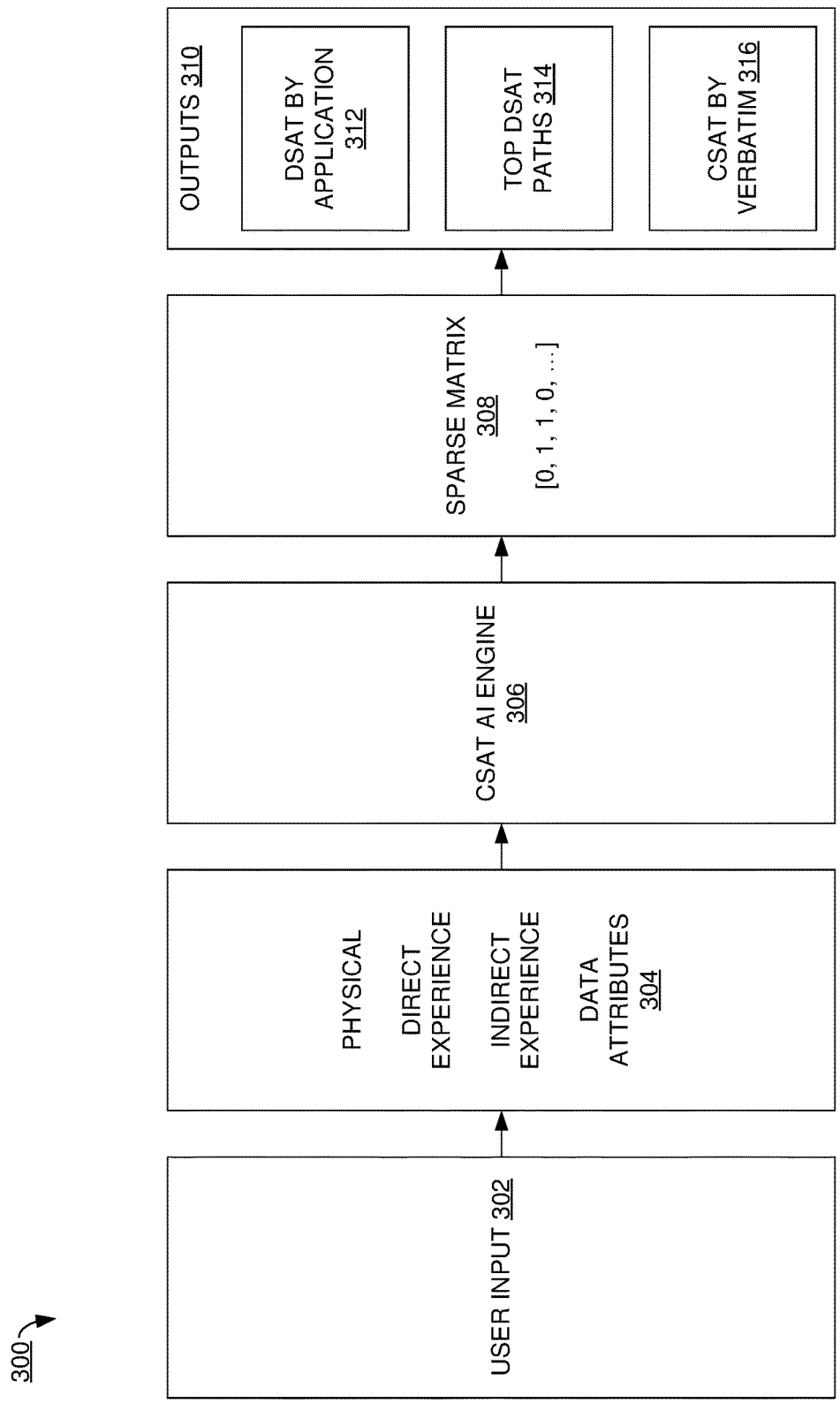
FIG. 3 illustrates an example system architecture for creating a sparse matrix, and that can facilitate quantifying user experience, in accordance with an embodiment of this disclosure.

FIG. 3 illustrates an example system architecture 300 for creating a sparse matrix, and that can facilitate quantifying user experience, in accordance with an embodiment of this disclosure. In some examples, system architecture 300 can be used to implement part(s) of quantifying user experience component 104 of FIG. 1. System architecture 300 can be implemented with part(s) of computing environment 1000 of FIG. 10.

System architecture 300 comprises user input 302, physical/direct experience/indirect experience/data attributes 304, CSAT AI engine 306, sparse matrix 308, and outputs 310 (which can be similar to outputs 210 of FIG. 2). In turn, outputs 310 comprises DSAT) by application 312, top DSAT paths 314, and CSAT by verbatim 316 (which can be similar to (DSAT by application 232, top DSAT paths 234, and CSAT by verbatim 236 of FIG. 2, respectively).

user input 302 can be similar to input 202 of FIG. 2. Physical/direct experience/indirect experience/data attributes 304 can comprise types of user input received at user input 302. CSAT AI engine 306 can implement functions similar to AI ensemble modeling 204 of FIG. 2.

Sparse matrix 308 can comprise a matrix representation of web journey data. A matrix can be considered sparse where a majority of values stored in the matrix are NULL (e.g., the values indicate that a corresponding activity did not occur). For example, where a matrix stores values where each position in the matrix corresponds to a particular web journey activity, a value of 1 at a given position can indicate that the corresponding activity occurred, while a value of 0 at that position can indicate that the corresponding activity did not occur. A sparse matrix can be an efficient way to represent data, because it can aid in faster and more comprehensive data manipulation.

Sparse matrix 308 can be binary. A matrix can be considered to be binary where it stores one of two possible values at each position within the matrix—e.g., 0 and 1.

Sparse matrix 308 can be unordered. That is, take an example matrix of [0, 1, 0, 1], which indicates that a user account downloaded a driver and accessed a "contact us" web page. Web journey information where the user account first downloaded the driver, and then accessed the web page would be represented in an unordered matrix in the same way as the user account first accessed the web page and then downloaded the driver. That is, information about an order of these events could be disregarded, and both web journeys could be represented as [0, 1, 0, 1].

The present techniques can utilize a sparse matrix representation of data (e.g., sparse matrix 308) to provide an advantage of a fast and efficient way to apply machine learning techniques, and provide stakeholders with specific analysis and insights. This approach can provide a foundation for an artificial intelligence model to provide proactive support to users based on their predicted propensity to give a bad rating.

In some examples, each CSAT survey can have a service-tag as a field associated with it. In some examples, service tags can be captured for, on average, 60% of users.

In some examples, a sparse matrix (e.g., sparse matrix 308) can be created as follows. Using service-tag as a primary key, CSAT data can be joined by CSAT AI engine 306 with multiple data sources, such as web traffic, contents, and intents (e.g., physical/direct experience/indirect experience/data attributes 304).

After multiple hypothesis testing by CSAT AI engine 306, some columns for sparse matrix 308 can be derived for each major activity of a user on a website. Examples of columns include an indication of whether a user tried to run a form of scan on the website; an indication of whether the user tried to read display related content or articles; an indication of whether a user tried to download, or did download, a particular driver; and an indication of whether a user visited a "contact us" page on the website.

A time range can be used for activities to populate a sparse matrix. For example, an activity can be identified as performed where a user performed (e.g., assigned a value of 1) that activity within a prior four weeks to creating the sparse matrix.

A matrix can be compressed, such that a single row can comprise all physical and experimental data of a user in the matrix. A journey of a user can be created from a matrix by selecting columns that correspond to a value of 1 (using an example where 0 indicates that an action did not occur for the user, and 1 indicates that it did). Using this approach, a journey can be created for a user independently of an order in which the user performed various actions (e.g., regardless of whether the user downloaded a driver before or after visiting a "contact us" web page).

For example, where a journey path is, "article," "audio driver," "contact us," "chat," then the user has visited an article page, downloaded an audio driver, and visited the "contact us" page. The user could have gone through the conditions defined under these columns in any order during the overall interaction. Where journey touchpoints are not sequenced, users with similar journeys can be grouped together for analysis.

In some examples, a journey is not sequenced, or ordered, because each user has a distinct journey and experience before filling out a CSAT survey. Thus, in some examples, to minimize a variance of data for analysis, a journey is not sequenced.

Figure 4:
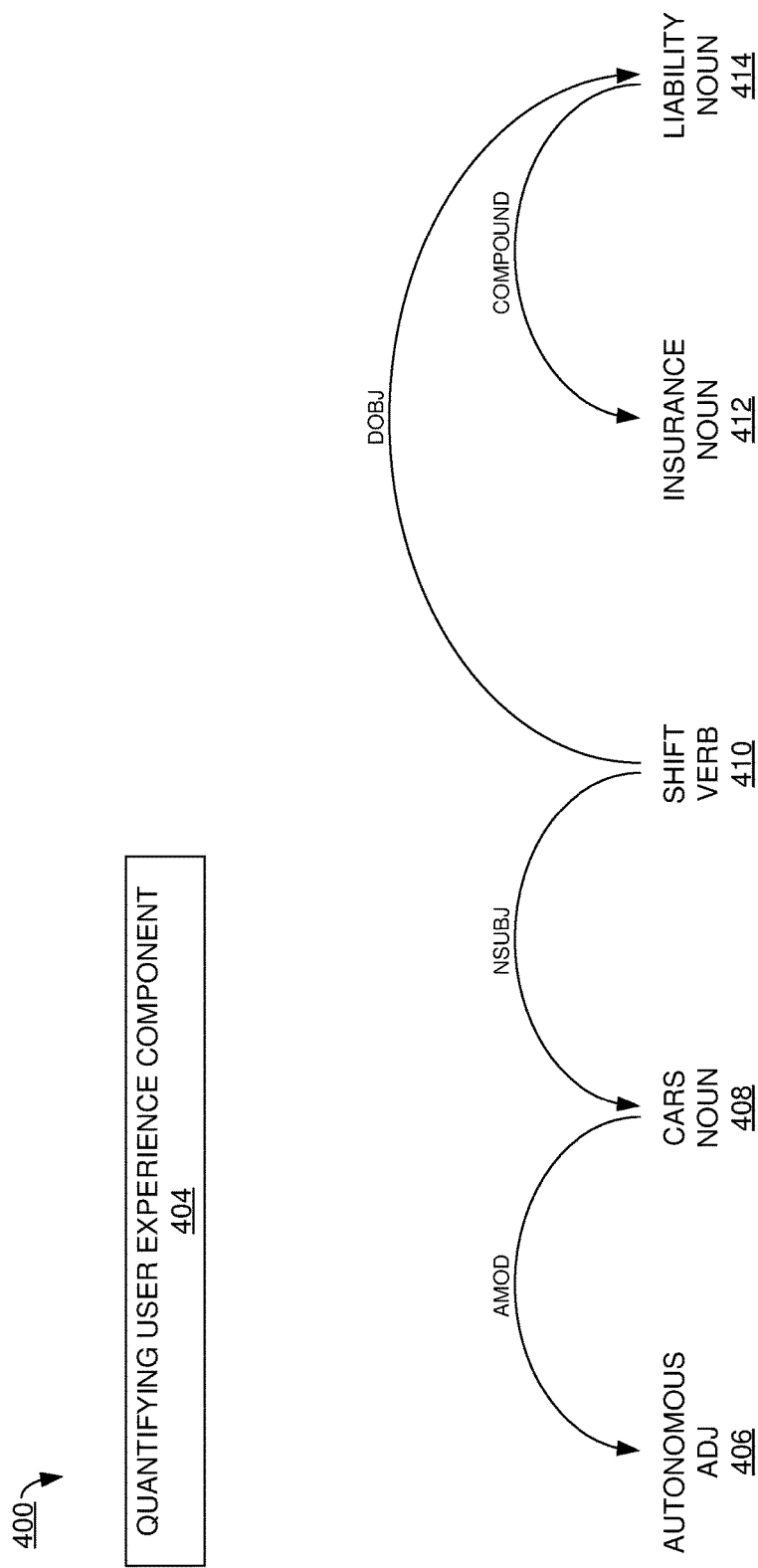
FIG. 4 illustrates an example system architecture of a dependency tree, and that can facilitate quantifying user experience, in accordance with an embodiment of this disclosure.

FIG. 4 illustrates an example system architecture 400 of a dependency tree, and that can facilitate quantifying user experience, in accordance with an embodiment of this disclosure. In some examples, system architecture 400 can be used to implement part(s) of quantifying user experience component 104 of FIG. 1. System architecture 400 can be implemented with part(s) of computing environment 1000 of FIG. 10.

Quantifying user experience component 404 can be similar to quantifying user experience component 104 of FIG. 1.

System architecture 400 also comprises words in a sentence "autonomous cars shift insurance liability," which are parsed into a dependency tree that comprises the words (and parts of speech) autonomous adj (adjective) 406, cars noun 408, shift verb 410, insurance noun 412, and liability noun 414. Dependencies between these words can be identified with arrows that identify the nature of the dependency (e.g., amod, nsubj, dobj, and compound).

In some examples, after creating a matrix (e.g., sparse matrix 308 of FIG. 3), verbatim preprocessing and objectives modeling can be performed. In some examples, a CSAT survey includes a textual response field in which a user can answer, "What did you like about the website?" and "What would you like to see improved on the website?" Response data (e.g., verbatim 212 of FIG. 2) can be gathered as short-form text data that provides the user's insight into why they came to the website, why they did, and, where applicable, why they were or were not able to complete their purpose.

In prior approaches, manual scrub teams can read through each verbatim individually to gather analysis. In examples according to the present techniques, a CSAT AI engine (e.g., CSAT AI engine 306 of FIG. 3) can include verbatims models that provide additional levels of insight, and permit users to filter through large amounts of text to find those that are relevant.

A machine learning model (e.g., as implemented by quantifying user experience component 402) can predict from a user's verbatim to a question of, "What would you like to see improved on the website?" and classify the verbatim into intent/intuition categories based on word choice, syntax, and/or tone. In some examples, there can be four categories (e.g., categories as described with respect to system architecture 500 of FIG. 5).

In comparison to sentiment analysis, where a verbatim (e.g., verbatim 212 of FIG. 2) can be classified as positive, neutral, or negative, these categories can provide a rich insight into verbatims, and additional, nuanced perspective. These categories can segment a customer's intent in leaving a verbatim (e.g., are they seeking an answer? Are they providing ideas for improvement as prompted? Are they frustrated by a process and want to vent?). These categories can differentiate and define these concepts to an aggregated level.

Natural language processing can be performed on a verbatim to determine the verbatim's intent. In some examples, a dependency parser (e.g., as implemented by quantifying user experience component 402) can be applied to a verbatim, which can jointly learn sentence segmentation and labelled dependency parsing. This approach can involve defining part-of-speech tags for words in a sentence, and connecting words by parent-child syntactic relationships in a dependency tree.

Figure 5:
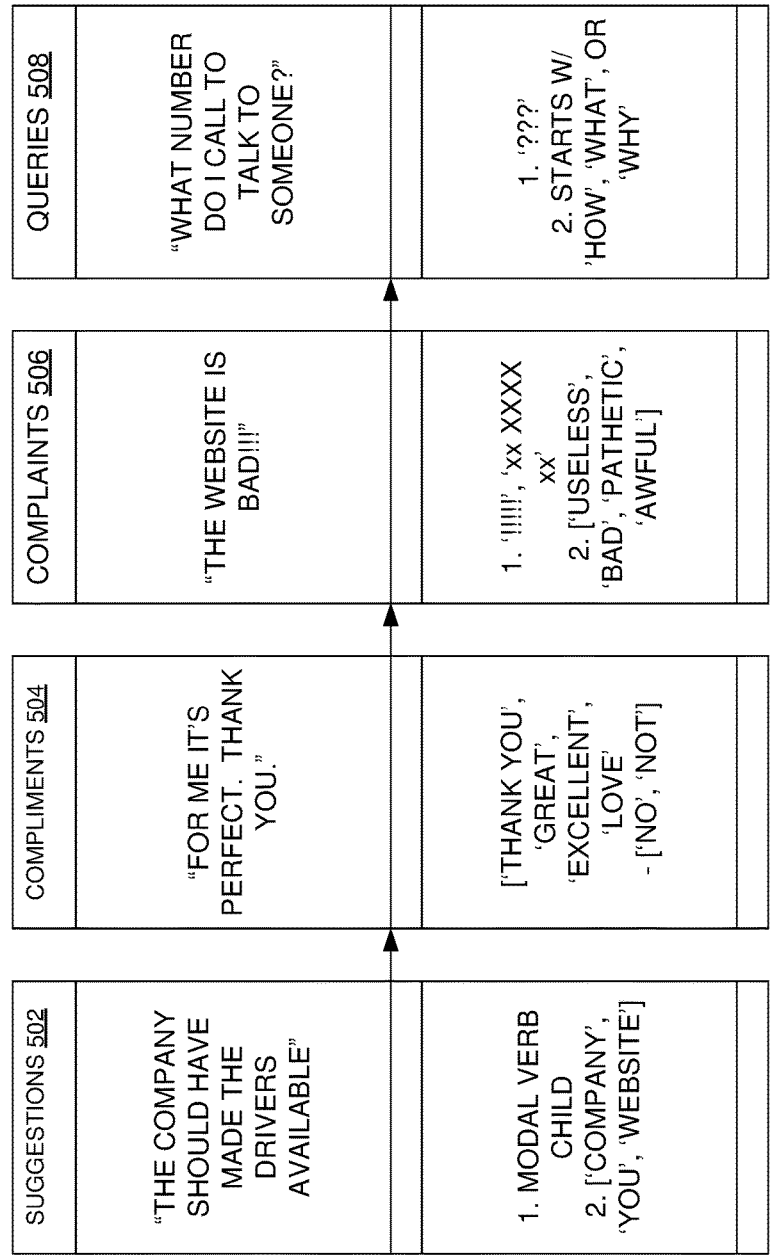
FIG. 5 illustrates an example system architecture for categorizing verbatims, and that can facilitate quantifying user experience, in accordance with an embodiment of this disclosure.

FIG. 5 illustrates an example system architecture 500 for categorizing verbatims, and that can facilitate quantifying user experience, in accordance with an embodiment of this disclosure. In some examples, system architecture 500 can be used to implement part(s) of quantifying user experience component 104 of FIG. 1.

System architecture 500 comprises suggestions 502, compliments 504, complaints 506, and queries 508.

A machine learning model (e.g., as implemented by quantifying user experience component 402 of FIG. 4) can predict from a user's verbatim (e.g., verbatim 212 of FIG. 2) to a question of, "What would you like to see improved on the website?" and classify the verbatim into intent/intuition categories based on word choice, syntax, and/or tone. In some examples, such as in system architecture 500, there can be four categories. It can be appreciated that there can be examples that implement more than four categories, or fewer than four categories.

Suggestions 502 can be a category that provides a default answer to the question, "What would you like to see improved?" For example, a verbatim in this category can be "better site navigation," or "you should make it easier to contact." Suggestions can include modal verbs like "should" and lean toward a neutral tone.

Compliments 504 can be a category that can be applied to responses that can be characterized by positive text, and/or include phrases such as "thank you," "nothing," "excellent," and/or "great."

Complaints 506 can be a category that can be applied to strongly worded responses where a user is upset or frustrated. For example, a verbatim in this category can be "This website is BAD!!" Complaints can be characterized by negative adjectives, capitalization, multiple punctuation marks, and/or a long verbatim.

Queries 508 can be a category that can indicate that a user is looking for an answer to something, or there is a question in the verbatim. Examples can include, "What number do I call to talk with someone?" and "How do I fix this issue?"

Using defined semantic rules, a natural language processing problem can be shifted from an unsupervised problem to a supervised problem by defining categories of intuitions (e.g., the categories of system architecture 500). By creating semantic rules surrounding what is defined as belonging to various categories (e.g., a suggestion, a compliment, a complaint, or a query), verbatims can be parsed and categorized.

In some examples, where these semantic rules are not comprehensive and do not capture every possible verbatim variation, transfer learning techniques can be applied to categorize other variations, and develop an operationalized pipeline.

In some examples, a deep learning library for simplifying deep learning with fast and accurate neural networks for vision, text, tabular, and collaborative filtering models can be used (e.g., as part of CSAT AI engine 306 of FIG. 3, or quantifying user experience component 104 of FIG. 1). Using transfer learning (which can generally comprise a practice of reusing models and adapting them for new purposes), a pretrained language model can be used that predicts a next word in a sentence.

The last layers of this pretrained model can be unfrozen and re-trained, to fine tune the model to a specific text domain of categorizing verbatims, which can allow the model to understand words and contexts specifically to the present use cases. Then, an encoder can be extracted from the model to pair with a text classifier, which can also be fine-tuned through a process of unfreezing and re-training.

The model can be iteratively trained, such as trained weekly on new verbatims (e.g., verbatim 212 of FIG. 2) that are received as part of a CSAT survey.

A keyword and keyword categories component can capture general tags of certain topics covered in a verbatim by mapping its text to a predefined dictionary of keywords. Each category can encompass a list of potential keywords that can capture details about a verbatim. For example, consider the verbatim, "I had so much trouble downloading a driver, and the bios was faulty. However, it was easy to resolve when I called and worked it out with an agent." This text can be flagged and captured in a sparse matrix under "driver" and "contact" due to the presence of keywords, "download," "driver," "bios," "agent," and "call." By aggregating and capturing these keywords, high level trends of what users are saying can be identified, as well as drilling down into deep dives to filter to verbatims with specific keywords.

After performing verbatims processing and objectives modeling, journey-based outputs (e.g., journey output 224 of FIG. 2) can be combined with verbatims output (e.g., verbatim output 222). This combined output can be utilized in a variety of cases. Data coalescence for use case analysis can be performed.

For example, an AI engine dashboard (e.g., as part of outputs 210) can be implemented that comprises an interactive dashboard built for stakeholders to track both high-level trends and study deep dives into complicated questions without needing technical or coding ability.

In another example, journey mapping can be performed, where a process-mining component can ingest web journey features (such as applications visited) and provide detailed journey flows (e.g., top DSAT paths 234) for users on a website.

In another example, an automated insights tool can comprise a model that filters a combination of top physical attributes with an impact on CSAT score during a certain time. An output of an automated insights tool model can feed into a CSAT AI engine to develop a complete picture of these attributes. With the complete attributes associated with the user journey and experience, this architecture can help identify underlined trends in the data and can improve an accuracy of CSAT forecasting.

In another example, a CSAT impact analysis can be determined, which can indicate how a selection impacts a CSAT score. A CSAT impact score can be used to determine how a specific selection or filtered results factors into an overall CSAT score determination, and an expected CSAT score improvement.

In CSAT impact analysis, a CSAT impact can comprise coverage*CSAT gap; coverage can comprise a number of CSAT surveys selected by filter/a total number of CSAT surveys. CSAT gap can comprise a CSAT impact of a filtered selection/an overall CSAT impact; and bps can comprise basis points of a CSAT impact (e.g., 100 bps=0.1 CSAT impact).

The present techniques can be applied to real-time data to show and track performance of specific parts of a website from a CSAT score point of view. Real-time capability can facilitate quick identification of factors impacting a user rating for a website, and facilitate proactive solutions to decrease dissatisfied users. Through real-time data consumption and derived columns as input, a CSAT AI engine can foster proactive resource allocation and problem solving by training a machine learning model to predict CSAT. This model can help in providing proactive support to a potential dissatisfied user through virtual assistant integration.

Example Process Flows

Figure 6:
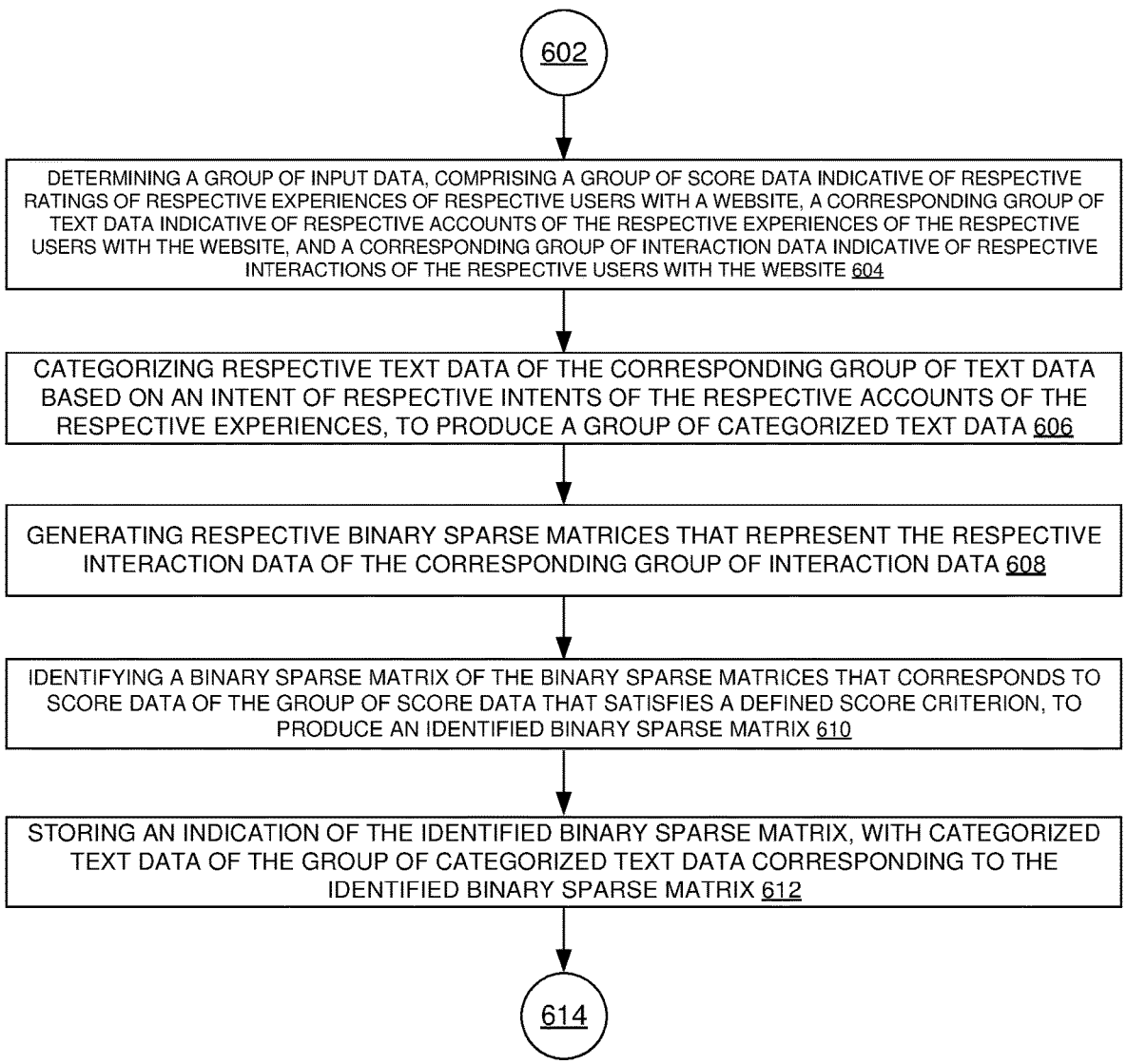
FIG. 6 illustrates an example process flow for quantifying user experience, in accordance with an embodiment of this disclosure.

FIG. 6 illustrates an example process flow 600 for quantifying user experience, in accordance with an embodiment of this disclosure. In some examples, one or more embodiments of process flow 600 can be implemented by quantifying user experience component 104 of FIG. 1, or computing environment 1000 of FIG. 10.

It can be appreciated that the operating procedures of process flow 600 are example operating procedures, and that there can be embodiments that implement more or fewer operating procedures than are depicted, or that implement the depicted operating procedures in a different order than as depicted. In some examples, process flow 600 can be implemented in conjunction with one or more embodiments of one or more of process flow 700 of FIG. 7, process flow 800 of FIG. 8, and/or process flow 900 of FIG. 9.

Process flow 600 begins with 602, and moves to operation 604. Operation 604 depicts determining a group of input data, comprising a group of score data indicative of respective ratings of respective experiences of respective users with a website, a corresponding group of text data indicative of respective accounts of the respective experiences of the respective users with the website, and a corresponding group of interaction data indicative of respective interactions of the respective users with the website. In some examples, this text data and score data can comprise verbatim 212 of FIG. 3, and this interaction data can comprise web journey data 214.

After operation 604, process flow 600 moves to operation 606.

Operation 606 depicts categorizing respective text data of the corresponding group of text data based on an intent of respective intents of the respective accounts of the respective experiences, to produce a group of categorized text data. That is, verbatims can be processed to be categorized based on intent, similar to as discussed with respect to system architecture 500 of FIG. 5.

In some examples, the categorizing of the respective text data comprises categorizing the respective text data as one of a complaint, a suggestion, a query, or a compliment. These are example categories, and can be distinguished from a sentiment categorization (e.g., positive, neutral, or negative).

In some examples, operation 606 comprises training a machine learning model with supervised learning, wherein input data to the machine learning model comprising respective learning text and corresponding respective category labels. That is, a machine learning model can be trained with a labelled data set to categorize verbatims.

In some examples, the categorizing of the respective text data comprises applying natural language processing to the respective text data. That is, natural language processing techniques can be applied to a verbatim, such as those described with respect to FIG. 4.

After operation 606, process flow 600 moves to operation 608.

Operation 608 depicts generating respective binary sparse matrices that represent the respective interaction data of the corresponding group of interaction data. These binary sparse matrices can be similar to sparse matrix 308 of FIG. 3.

In some examples, the respective binary sparse matrices store the respective interaction data without regard to an order of interactions that a user of the users underwent with respect to the website. That is, a matrix can comprise an unordered representation of website journey information.

In some examples, values of the respective binary sparse matrices are binary. In some examples, an entry of a binary sparse matrix of the binary sparse matrices indicates whether a user of the users underwent a specified interaction with the website. That is, values of a matrix can be one of two values, such as 0 (which can indicate that an action corresponding to that entry in a matrix did not occur) or 1 (which can indicate that it did occur).

After operation 608, process flow 600 moves to operation 610.

Operation 610 depicts identifying a binary sparse matrix of the binary sparse matrices that corresponds to score data of the group of score data that satisfies a defined score criterion, to produce an identified binary sparse matrix. That is, using the matrix data, a matrix with a significant CSAT score deviation from the group (or of a sub-group of the matrices) can be identified.

After operation 610, process flow 600 moves to operation 612.

Operation 612 depicts storing an indication of the identified binary sparse matrix, with categorized text data of the group of categorized text data corresponding to the identified binary sparse matrix. This can be stored in a memory of server 102.

After operation 612, process flow 600 moves to 614, where process flow 600 ends.

FIG. 7 illustrates another example process flow 700 for quantifying user experience, in accordance with an embodiment of this disclosure. In some examples, one or more embodiments of process flow 700 can be implemented by quantifying user experience component 104 of FIG. 1, or computing environment 1000 of FIG. 10.

It can be appreciated that the operating procedures of process flow 700 are example operating procedures, and that there can be embodiments that implement more or fewer operating procedures than are depicted, or that implement the depicted operating procedures in a different order than as depicted. In some examples, process flow 700 can be implemented in conjunction with one or more embodiments of one or more of process flow 600 of FIG. 6, process flow 800 of FIG. 8, and/or process flow 900 of FIG. 9.

Process flow 700 begins with 702, and moves to operation 704. Operation 704 depicts determining a group of input data, comprising a group of score data indicative of respective ratings of user experiences with a website, and a corresponding group of interaction data indicative of respective user interactions with the website during the user experiences. In some examples, operation 704 can be implemented in a similar manner as operation 604 of FIG. 6.

In some examples, the group of input data further comprises a group of text data indicative of respective accounts of users associated with the user experiences with the website, and operation 704 comprises categorizing respective text data of the group of text data based on an intent of respective intents applicable to the respective accounts of experiences, resulting in a group of categorized text data, storing the indication of the identified binary sparse matrix with categorized text data of the group of categorized text data corresponding to the identified binary sparse matrix. That is, operations can be performed that are similar to operations 604-606 and 612 of FIG. 6.

In some examples where the group of input data further comprises the group of text data, operation 704 can further comprise processing the group of text data, resulting in respective summaries of the text data, where storing the indication of the identified binary sparse matrix comprises storing the respective summaries of the text data. That is, key contents of a verbatim can be summarized and stored.

In some examples where the group of input data further comprises the group of text data, operation 704 can further comprise connecting words in the respective text data by parent-child syntactic relationships in a dependency tree. That is, techniques similar to those described with respect to FIG. 4 can be implemented.

In some examples, the group of score data comprises respective service tags, and operation 704 can comprise joining first data from a first datastore that stores the group of score data with second data from a second datastore that stores the corresponding group of interaction data, using the respective service tags as primary keys to each of the first datastore and the second datastore. That is, different types of data (such as CSAT scores, verbatims, and web journeys) can be combined. Using service-tag as a primary key, CSAT data can be joined with multiple data sources such as web-traffic, contacts, and intents.

After operation 704, process flow 700 moves to operation 706.

Operation 706 depicts generating respective binary sparse matrices that represent the respective interaction data of the corresponding group of interaction data. In some examples, operation 706 can be implemented in a similar manner as operation 608 of FIG. 6.

In some examples, operation 706 comprises executing hypothesis testing to determine types of interactions with the website that are able to be reflected in the corresponding group of interaction data, and grouping respective binary sparse matrices according to the types of interactions, wherein the identified binary sparse matrix is part of a first group that corresponds to a first interaction of the types of interactions, and wherein the identified binary sparse matrix is identified from within the first group. That is, hypothesis testing can be performed to determine columns to use for matrices. These columns can be derived for major activities of users on a website.

After operation 706, process flow 700 moves to operation 708.

Operation 708 depicts identifying a binary sparse matrix of the binary sparse matrices that corresponds to score data of the group of score data that satisfies a defined criterion, resulting in an identified binary sparse matrix. In some examples, operation 708 can be implemented in a similar manner as operation 610 of FIG. 6.

After operation 708, process flow 700 moves to operation 710.

Operation 710 depicts storing an indication of the identified binary sparse matrix. In some examples, operation 710 can be implemented in a similar manner as operation 612 of FIG. 6.

After operation 710, process flow 700 moves to 712, where process flow 700 ends.

FIG. 8 illustrates another example process flow 800 for quantifying user experience, in accordance with an embodiment of this disclosure. In some examples, one or more embodiments of process flow 800 can be implemented by quantifying user experience component 104 of FIG. 1, or computing environment 1000 of FIG. 10.

It can be appreciated that the operating procedures of process flow 800 are example operating procedures, and that there can be embodiments that implement more or fewer operating procedures than are depicted, or that implement the depicted operating procedures in a different order than as depicted. In some examples, process flow 800 can be implemented in conjunction with one or more embodiments of one or more of process flow 600 of FIG. 6, process flow 700 of FIG. 7, and/or process flow 900 of FIG. 9.

Process flow 800 begins with 802, and moves to operation 804. Operation 804 depicts determining a group of input data, comprising a group of score data indicative of respective ratings of experiences with a website by respective users, and a corresponding group of interaction data indicative of the respective interactions of the respective users with the website. In some examples, operation 804 can be implemented in a similar manner as operation 604 of FIG. 6.

In some examples, the group of input data comprises a group of text data indicative of the respective accounts of experiences with the website, and operation 804 comprises categorizing respective text data of the group of text data based on an intent of respective intents determined to be associated with the respective accounts of experiences, to produce a group of categorized text data, and storing an indication of the identified matrix with categorized text data of the group of categorized text data corresponding to the identified matrix. That is, a verbatim can be processed.

In some examples, operation 804 comprises unfreezing and training a last layer of a machine learning model that categorizes text data on input data that relates to the website, to produce a revised machine learning model from the machine learning model, and categorizing the respective text data with the revised machine learning model. That is, transfer learning of a machine learning model can be applied to customize a model to the present use case.

In some examples, operation 804 comprises identifying pre-defined keywords in the respective text data, and storing an association between the pre-defined keywords and the respective text data. That is, a keyword and keyword categories component can capture general tags of certain topics covered in a verbatim by mapping its text to a predefined dictionary of keywords After operation 804, process flow 800 moves to operation 806.

Operation 806 depicts generating respective matrices that represent the respective interaction data of the corresponding group of interaction data. In some examples, operation 806 can be implemented in a similar manner as operation 608 of FIG. 6.

After operation 806, process flow 800 moves to operation 808.

Operation 808 depicts identifying a matrix of the matrices that corresponds to score data of the group of score data that satisfies a defined score criterion, to produce an identified matrix. In some examples, operation 808 can be implemented in a similar manner as operation 610 of FIG. 6.

In some examples, operation 808 comprises presenting, via a user interface, an indication of the group of score data and corresponding respective applications that correspond to the interaction data of the respective interaction data corresponding to the identified matrix. That is, an output similar to DSAT by application 232 of FIG. 2 can be made.

In some examples, the defined score criterion is a first defined criterion, and operation 808 comprises presenting in a user interface a visual indication of interactions with the website that correspond to the score data of the group of score data that satisfies a second defined criterion different from the first defined criterion. That is, an output similar to top DSAT paths 234 of FIG. 2 can be made.

After operation 808, process flow 800 moves to 810, where process flow 800 ends.

FIG. 9 illustrates an example process flow 900 for aggregating journey matrix data, and that can facilitate quantifying user experience, in accordance with an embodiment of this disclosure. In some examples, one or more embodiments of process flow 900 can be implemented by quantifying user experience component 104 of FIG. 1, or computing environment 1000 of FIG. 10.

It can be appreciated that the operating procedures of process flow 900 are example operating procedures, and that there can be embodiments that implement more or fewer operating procedures than are depicted, or that implement the depicted operating procedures in a different order than as depicted. In some examples, process flow 900 can be implemented in conjunction with one or more embodiments of one or more of process flow 600 of FIG. 6, process flow 700 of FIG. 7, and/or process flow 800 of FIG. 8.

Process flow 900 can be implemented to aggregate matrix data into groups based on similarity, and then finding outliers within the groups. This can be similar to output consolidation 208 of FIG. 2.

Process flow 900 begins with 902, and moves to operation 904.

Operation 904 depicts grouping respective binary sparse matrices according to a defined criterion, to produce multiple groupings that include a first grouping of binary sparse matrices, wherein the first grouping of binary sparse matrices comprises an identified binary sparse matrix. In some examples, this can comprise clustering 226, filtering 228, and/or consolidation 230 of FIG. 2.

After operation 904, process flow 900 moves to operation 906.

Operation 906 depicts identifying the identified binary sparse matrix that has score data of a group of score data that satisfies the defined criterion from among the first grouping of binary sparse matrices. That is, once matrices have been divided into groups, a matrix can be identified from within the subset of matrices within a group, rather than relative to all of the matrices.

After operation 906, process flow 900 moves to 908, where process flow 900 ends.

Example Operating Environment

In order to provide additional context for various embodiments described herein, FIG. 10 and the following discussion are intended to provide a brief, general description of a suitable computing environment 1000 in which the various embodiments of the embodiment described herein can be implemented.

For example, parts of computing environment 1000 can be used to implement one or more embodiments of server 102, web server 106, and/or client computers 108 of FIG. 1.

In some examples, computing environment 1000 can implement one or more embodiments of the process flows of FIGS. 6-9 to facilitate quantifying user experience.

While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the various methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 10, the example environment 1000 for implementing various embodiments described herein includes a computer 1002, the computer 1002 including a processing unit 1004, a system memory 1006 and a system bus 1008. The system bus 1008 couples system components including, but not limited to, the system memory 1006 to the processing unit 1004. The processing unit 1004 can be any of various commercially available processors. Dual microprocessors and other multi-processor architectures can also be employed as the processing unit 1004.

The system bus 1008 can be any of several types of bus structure that can further interconnect to a memory bus (with or without a memory controller), a peripheral bus, and a local bus using any of a variety of commercially available bus architectures. The system memory 1006 includes ROM 1010 and RAM 1012. A basic input/output system (BIOS) can be stored in a nonvolatile storage such as ROM, erasable programmable read only memory (EPROM), EEPROM, which BIOS contains the basic routines that help to transfer information between elements within the computer 1002, such as during startup. The RAM 1012 can also include a high-speed RAM such as static RAM for caching data.

The computer 1002 further includes an internal hard disk drive (HDD) 1014 (e.g., EIDE, SATA), one or more external storage devices 1016 (e.g., a magnetic floppy disk drive (FDD) 1016, a memory stick or flash drive reader, a memory card reader, etc.) and an optical disk drive 1020 (e.g., which can read or write from a CD-ROM disc, a DVD, a BD, etc.). While the internal HDD 1014 is illustrated as located within the computer 1002, the internal HDD 1014 can also be configured for external use in a suitable chassis (not shown). Additionally, while not shown in environment 1000, a solid state drive (SSD) could be used in addition to, or in place of, an HDD 1014. The HDD 1014, external storage device(s) 1016 and optical disk drive 1020 can be connected to the system bus 1008 by an HDD interface 1024, an external storage interface 1026 and an optical drive interface 1028, respectively. The interface 1024 for external drive implementations can include at least one or both of Universal Serial Bus (USB) and Institute of Electrical and Electronics Engineers (IEEE) 1094 interface technologies. Other external drive connection technologies are within contemplation of the embodiments described herein.

The drives and their associated computer-readable storage media provide nonvolatile storage of data, data structures, computer-executable instructions, and so forth. For the computer 1002, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1012, including an operating system 1030, one or more application programs 1032, other program modules 1034 and program data 1036. All or portions of the operating system, applications, modules, and/or data can also be cached in the RAM 1012. The systems and methods described herein can be implemented utilizing various commercially available operating systems or combinations of operating systems.

Computer 1002 can optionally comprise emulation technologies. For example, a hypervisor (not shown) or other intermediary can emulate a hardware environment for operating system 1030, and the emulated hardware can optionally be different from the hardware illustrated in FIG. 10. In such an embodiment, operating system 1030 can comprise one virtual machine (VM) of multiple VMs hosted at computer 1002. Furthermore, operating system 1030 can provide runtime environments, such as the Java runtime environment or the .NET framework, for applications 1032. Runtime environments are consistent execution environments that allow applications 1032 to run on any operating system that includes the runtime environment. Similarly, operating system 1030 can support containers, and applications 1032 can be in the form of containers, which are lightweight, standalone, executable packages of software that include, e.g., code, runtime, system tools, system libraries and settings for an application.

Further, computer 1002 can be enable with a security module, such as a trusted processing module (TPM). For instance, with a TPM, boot components hash next in time boot components, and wait for a match of results to secured values, before loading a next boot component. This process can take place at any layer in the code execution stack of computer 1002, e.g., applied at the application execution level or at the operating system (OS) kernel level, thereby enabling security at any level of code execution.

A user can enter commands and information into the computer 1002 through one or more wired/wireless input devices, e.g., a keyboard 1038, a touch screen 1040, and a pointing device, such as a mouse 1042. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1004 through an input device interface 1044 that can be coupled to the system bus 1008, but can be connected by other interfaces, such as a parallel port, an IEEE 1094 serial port, a game port, a USB port, an IR interface, a BLUETOOTH® interface, etc.

A monitor 1046 or other type of display device can be also connected to the system bus 1008 via an interface, such as a video adapter 1048. In addition to the monitor 1046, a computer typically includes other peripheral output devices (not shown), such as speakers, printers, etc.

The computer 1002 can operate in a networked environment using logical connections via wired and/or wireless communications to one or more remote computers, such as a remote computer(s) 1050. The remote computer(s) 1050 can be a workstation, a server computer, a router, a personal computer, portable computer, microprocessor-based entertainment appliance, a peer device or other common network node, and typically includes many or all of the elements described relative to the computer 1002, although, for purposes of brevity, only a memory/storage device 1052 is illustrated. The logical connections depicted include wired/wireless connectivity to a local area network (LAN) 1054 and/or larger networks, e.g., a wide area network (WAN) 1056. Such LAN and WAN networking environments are commonplace in offices and companies, and facilitate enterprise-wide computer networks, such as intranets, all of which can connect to a global communications network, e.g., the Internet.

When used in a LAN networking environment, the computer 1002 can be connected to the local network 1054 through a wired and/or wireless communication network interface or adapter 1058. The adapter 1058 can facilitate wired or wireless communication to the LAN 1054, which can also include a wireless access point (AP) disposed thereon for communicating with the adapter 1058 in a wireless mode.

When used in a WAN networking environment, the computer 1002 can include a modem 1060 or can be connected to a communications server on the WAN 1056 via other means for establishing communications over the WAN 1056, such as by way of the Internet. The modem 1060, which can be internal or external and a wired or wireless device, can be connected to the system bus 1008 via the input device interface 1044. In a networked environment, program modules depicted relative to the computer 1002 or portions thereof, can be stored in the remote memory/storage device 1052. It will be appreciated that the network connections shown are example and other means of establishing a communications link between the computers can be used.

When used in either a LAN or WAN networking environment, the computer 1002 can access cloud storage systems or other network-based storage systems in addition to, or in place of, external storage devices 1016 as described above. Generally, a connection between the computer 1002 and a cloud storage system can be established over a LAN 1054 or WAN 1056 e.g., by the adapter 1058 or modem 1060, respectively. Upon connecting the computer 1002 to an associated cloud storage system, the external storage interface 1026 can, with the aid of the adapter 1058 and/or modem 1060, manage storage provided by the cloud storage system as it would other types of external storage. For instance, the external storage interface 1026 can be configured to provide access to cloud storage sources as if those sources were physically connected to the computer 1002.

The computer 1002 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

CONCLUSION

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory in a single machine or multiple machines. Additionally, a processor can refer to an integrated circuit, a state machine, an application specific integrated circuit (ASIC), a digital signal processor (DSP), a programmable gate array (PGA) including a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units. One or more processors can be utilized in supporting a virtualized computing environment. The virtualized computing environment may support one or more virtual machines representing computers, servers, or other computing devices. In such virtualized virtual machines, components such as processors and storage devices may be virtualized or logically represented. For instance, when a processor executes instructions to perform "operations", this could include the processor performing the operations directly and/or facilitating, directing, or cooperating with another device or component to perform the operations.

In the subject specification, terms such as "data store," data storage," "database," "cache," and substantially any other information storage component relevant to operation and functionality of a component, refer to "memory components," or entities embodied in a "memory" or components comprising the memory. It will be appreciated that the memory components, or computer-readable storage media, described herein can be either volatile memory or nonvolatile storage, or can include both volatile and nonvolatile storage. By way of illustration, and not limitation, nonvolatile storage can include ROM, programmable ROM (PROM), EPROM, EEPROM, or flash memory. Volatile memory can include RAM, which acts as external cache memory. By way of illustration and not limitation, RAM can be available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

The illustrated embodiments of the disclosure can be practiced in distributed computing environments where certain tasks are performed by remote processing devices that are linked through a communications network. In a distributed computing environment, program modules can be located in both local and remote memory storage devices.

The systems and processes described above can be embodied within hardware, such as a single integrated circuit (IC) chip, multiple ICs, an ASIC, or the like. Further, the order in which some or all of the process blocks appear in each process should not be deemed limiting. Rather, it should be understood that some of the process blocks can be executed in a variety of orders that are not all of which may be explicitly illustrated herein.

As used in this application, the terms "component," "module," "system," "interface," "cluster," "server," "node," or the like are generally intended to refer to a computer-related entity, either hardware, a combination of hardware and software, software, or software in execution or an entity related to an operational machine with one or more specific functionalities. For example, a component can be, but is not limited to being, a process running on a processor, a processor, an object, an executable, a thread of execution, computer-executable instruction(s), a program, and/or a computer. By way of illustration, both an application running on a controller and the controller can be a component. One or more components may reside within a process and/or thread of execution and a component may be localized on one computer and/or distributed between two or more computers. As another example, an interface can include input/output (I/O) components as well as associated processor, application, and/or application programming interface (API) components.

Further, the various embodiments can be implemented as a method, apparatus, or article of manufacture using standard programming and/or engineering techniques to produce software, firmware, hardware, or any combination thereof to control a computer to implement one or more embodiments of the disclosed subject matter. An article of manufacture can encompass a computer program accessible from any computer-readable device or computer-readable storage/ communications media. For example, computer readable storage media can include but are not limited to magnetic storage devices (e.g., hard disk, floppy disk, magnetic strips . . . ), optical discs (e.g., CD, DVD . . . ), smart cards, and flash memory devices (e.g., card, stick, key drive . . . ). Of course, those skilled in the art will recognize many modifications can be made to this configuration without departing from the scope or spirit of the various embodiments.

In addition, the word "example" or "exemplary" is used herein to mean serving as an example, instance, or illustration. Any embodiment or design described herein as "exemplary" is not necessarily to be construed as preferred or advantageous over other embodiments or designs. Rather, use of the word exemplary is intended to present concepts in a concrete fashion. As used in this application, the term "or" is intended to mean an inclusive "or" rather than an exclusive "or." That is, unless specified otherwise, or clear from context, "X employs A or B" is intended to mean any of the natural inclusive permutations.

That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

What has been described above includes examples of the present specification. It is, of course, not possible to describe every conceivable combination of components or methods for purposes of describing the present specification, but one of ordinary skill in the art may recognize that many further combinations and permutations of the present specification are possible. Accordingly, the present specification is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system, comprising:
   at least one processor; and
   at least one memory that stores executable instructions that, when executed by the at least one processor, facilitate performance of operations, comprising:
   determining a group of input data, comprising:
      a group of score data indicative of respective ratings of respective experiences of respective users with a website,
      a corresponding group of text data indicative of respective accounts of the respective experiences of the respective users with the website, and
      a corresponding group of interaction data indicative of respective interactions of the respective users with the website;
   categorizing respective text data of the corresponding group of text data based on an intent of respective intents of the respective accounts of the respective experiences, to produce a group of categorized text data;
   generating respective binary sparse matrices that represent the respective interaction data of the corresponding group of interaction data;
   identifying a binary sparse matrix of the respective binary sparse matrices that corresponds to score data of the group of score data that satisfies a defined score criterion, to produce an identified binary sparse matrix; and
   storing an indication of the identified binary sparse matrix, with categorized text data of the group of categorized text data corresponding to the identified binary sparse matrix, wherein the categorizing of the respective text data comprises categorizing the respective text data as one of a complaint, a suggestion, a query, or a compliment.

2. The system of claim 1, wherein the respective binary sparse matrices store the respective interaction data without regard to an order of interactions that a user of the respective users underwent with respect to the website.

3. The system of claim 1, wherein values of the respective binary sparse matrices are binary.

4. The system of claim 1, wherein an entry of a binary sparse matrix of the respective binary sparse matrices indicates whether a user of the respective users underwent a specified interaction with the website.

5. The system of claim 1, wherein the defined score criterion is a first defined criterion, and wherein the operations further comprise:
   grouping the respective binary sparse matrices according to a second defined criterion, to produce multiple groupings that include a first grouping of binary sparse matrices, wherein the first grouping of binary sparse matrices comprises the identified binary sparse matrix; and
   identifying the identified binary sparse matrix that has the score data of the group of score data that satisfies the first defined criterion from among the first grouping of binary sparse matrices.

6. The system of claim 1, wherein the categorizing of the respective text data comprises:
   training a machine learning model with supervised learning, wherein input data to the machine learning model comprising respective learning text and corresponding respective category labels.

7. The system of claim 1, wherein the categorizing of the respective text data comprises applying natural language processing to the respective text data.

8. A method, comprising:
   determining, by a system comprising at least one processor, a group of input data, comprising:
      a group of score data indicative of respective ratings of respective experiences of respective users with a website,
      a corresponding group of text data indicative of respective accounts of the respective experiences of the respective users with the website, and
      a corresponding group of interaction data indicative of respective interactions of the respective users with the website;
   categorizing, by the system, respective text data of the corresponding group of text data based on an intent of respective intents of the respective accounts of the respective experiences, to produce a group of categorized text data;
   generating, by the system, respective binary sparse matrices that represent the respective interaction data of the corresponding group of interaction data;
   identifying, by the system, a binary sparse matrix of the respective binary sparse matrices that corresponds to score data of the group of score data that satisfies a defined score criterion, to produce an identified binary sparse matrix; and storing, by the system, an indication of the identified binary sparse matrix, with categorized text data of the group of categorized text data corresponding to the identified binary sparse matrix, wherein an entry of a binary sparse matrix of the respective binary sparse matrices indicates whether a user of the respective users underwent a specified interaction with the website.

9. The method of claim 8, wherein the group of input data further comprises a group of text data indicative of respective accounts of the respective users associated with the respective experiences with the website, and further comprising:

categorizing, by the system, respective text data of the group of text data based on an intent of respective intents applicable to the respective accounts of the respective experiences, resulting in a group of categorized text data;

storing, by the system, the indication of the identified binary sparse matrix with categorized text data of the group of categorized text data corresponding to the identified binary sparse matrix.

10. The method of claim 9, further comprising:
processing, by the system, the group of text data, resulting in respective summaries of the text data of the group of text data,
wherein storing the indication of the identified binary sparse matrix comprises storing the respective summaries of the text data.

11. The method of claim 9, wherein the categorizing of the respective text data comprises:
connecting words in the respective text data by parent-child syntactic relationships in a dependency tree.

12. The method of claim 8, wherein the group of score data comprises respective service tags, and further comprising:
joining, by the system, first data from a first datastore that stores the group of score data with second data from a second datastore that stores the corresponding group of interaction data, using the respective service tags as keys to the first datastore and the second datastore.

13. The method of claim 8, further comprising:
executing, by the system, hypothesis testing to determine types of interactions with the website that are able to be reflected in the corresponding group of interaction data; and
grouping the respective binary sparse matrices according to the types of interactions, wherein the identified binary sparse matrix is part of a group that corresponds to a type of interaction of the types of interactions, and wherein the identified binary sparse matrix is identified from within the group.

14. A non-transitory computer-readable medium comprising instructions that, in response to execution, cause a system comprising a processor to perform operations, comprising:
determining a group of input data, comprising:
a group of score data indicative of respective ratings of respective experiences of respective users with a website,
a corresponding group of text data indicative of respective accounts of the respective experiences of the respective users with the website, and
a corresponding group of interaction data indicative of respective interactions of the respective users with the website;

categorizing respective text data of the corresponding group of text data based on an intent of respective intents of the respective accounts of the respective experiences, to produce a group of categorized text data;

generating respective binary sparse matrices that represent the respective interaction data of the corresponding group of interaction data;

identifying a binary sparse matrix of the respective binary sparse matrices that corresponds to score data of the group of score data that satisfies a defined score criterion, to produce an identified binary sparse matrix; and storing an indication of the identified binary sparse matrix, with categorized text data of the group of categorized text data corresponding to the identified binary sparse matrix, wherein an entry of a binary sparse matrix of the respective binary sparse matrices indicates whether a user of the respective users underwent a specified interaction with the website.

15. The non-transitory computer-readable medium of claim 14, wherein the group of input data further comprises a group of text data indicative of the respective accounts of the respective experiences with the website, and wherein the operations further comprise:

categorizing respective text data of the group of text data based on an intent of respective intents determined to be associated with the respective accounts of the respective experiences, to produce a group of categorized text data;

storing an indication of the identified binary sparse matrix with categorized text data of the group of categorized text data corresponding to the identified binary sparse matrix.

16. The non-transitory computer-readable medium of claim 15, wherein the categorizing of the respective text data comprises:
connecting words in the respective text data by parent-child syntactic relationships in a dependency tree.

17. The non-transitory computer-readable medium of claim 15, wherein the operations further comprise:
unfreezing and training a last layer of a machine learning model that categorizes text data on input data that relates to the website, to produce a revised machine learning model from the machine learning model; and
categorizing the respective text data with the revised machine learning model.

18. The non-transitory computer-readable medium of claim 15, wherein the operations further comprise:
identifying pre-defined keywords in the respective text data; and
storing an association between the pre-defined keywords and the respective text data.

19. The non-transitory computer-readable medium of claim 14, wherein the operations further comprise:
presenting, via a user interface, an indication of the group of score data and corresponding respective applications that correspond to interaction data of the respective interaction data corresponding to the identified binary sparse matrix.

20. The non-transitory computer-readable medium of claim 14, wherein the defined score criterion is a first defined criterion, and wherein the operations further comprise:
presenting, via a user interface, a visual indication of interactions with the website that correspond to the score data of the group of score data that satisfies a second defined criterion different from the first defined criterion.

\* \* \* \* \*